US012684101B2

(12) United States Patent
Hergert et al.

(10) Patent No.: US 12,684,101 B2
(45) Date of Patent: Jul. 14, 2026

(54) ACTIVE DUAL PIXEL STEREO SYSTEM FOR DEPTH EXTRACTION

(71) Applicants:Robert John Hergert, Oakland, CA (US); Sagi Katz, Yokneam Ilit (IL); Gilad Refael, Ashdod (IL); Daniel Wagner, Vienna (AT); Weston Welge, Boulder, CO (US); Ramzi Zahreddine, Denver, CO (US)

(72) Inventors: Robert John Hergert, Oakland, CA (US); Sagi Katz, Yokneam Ilit (IL); Gilad Refael, Ashdod (IL); Daniel Wagner, Vienna (AT); Weston Welge, Boulder, CO (US); Ramzi Zahreddine, Denver, CO (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/550,409

(22) Filed: Dec. 14, 2021

(65) Prior Publication Data

US 2023/0188691 A1 Jun. 15, 2023

(51) Int. Cl.
H04N 13/128 (2018.01)
G06F 3/01 (2006.01)
(Continued)

(52) U.S. Cl.
CPC ........... H04N 13/128 (2018.05); G06F 3/017 (2013.01); G06T 7/521 (2017.01); G06V 10/143 (2022.01);
(Continued)

(58) Field of Classification Search
CPC .. H04N 13/128; H04N 13/207; H04N 13/332; H04N 13/254; H04N 13/271;
(Continued)

(56) References Cited

U.S. PATENT DOCUMENTS 10,665,037 B1 * 5/2020 Brimhall ............... G06T 19/006
11,100,664 B2 8/2021 Wantland et al.
(Continued)

FOREIGN PATENT DOCUMENTS

WO WO-2009034519 A1 * 3/2009 ......... H04N 13/0022
WO WO-2018189880 A1 * 10/2018 ........... G02B 27/017
WO WO-2021076185 A1 * 4/2021 ............. G06N 3/044

OTHER PUBLICATIONS

International Search Report and Written Opinion received in Patent Cooperation Treaty Application No. PCT/US2022/049756, mailed Feb. 23, 2023.

*Primary Examiner* — Dave Czekaj
*Assistant Examiner* — Shanika M Brumfield
(74) *Attorney, Agent, or Firm* — CM Law; Stephen J. Weed

(57) ABSTRACT

A miniaturized active dual pixel stereo system and method for close range depth extraction includes a projector adapted to project a locally distinct projected pattern onto an image of a scene and a dual pixel sensor including a dual pixel sensor array that generates respective displaced images of the scene. A three-dimensional image is generated from the displaced images of the scene by projecting the locally distinct projected pattern onto the image of the scene, capturing the respective displaced images of the scene using the dual pixel sensor, generating disparity images from the respective displaced images of the scene, determining depth to each pixel of the disparity images, and generating the three-dimensional image from the determined depth to each pixel. A three-dimensional image of a user's hands generated by the active dual pixel stereo system may be processed by gesture recognition software to provide an input to an electronic eyewear device.

7 Claims, 9 Drawing Sheets

600

(51) Int. Cl.

| | |
|---|---|
| *G06T 7/521* | (2017.01) |
| *G06V 10/143* | (2022.01) |
| *G06V 10/147* | (2022.01) |
| *G06V 10/75* | (2022.01) |
| *G06V 40/10* | (2022.01) |
| *H04N 13/207* | (2018.01) |
| *H04N 13/254* | (2018.01) |
| *H04N 13/271* | (2018.01) |
| *H04N 13/332* | (2018.01) |
| *H04N 23/11* | (2023.01) |
| *H04N 13/00* | (2018.01) |

(52) U.S. Cl.
CPC .......... *G06V 10/147* (2022.01); *G06V 10/751* (2022.01); *G06V 40/107* (2022.01); *H04N 13/207* (2018.05); *H04N 13/254* (2018.05); *H04N 13/271* (2018.05); *H04N 13/332* (2018.05); *H04N 23/11* (2023.01); *G06T 2200/04* (2013.01); *G06T 2207/10012* (2013.01); *G06T 2207/20228* (2013.01); *G06T 2207/30196* (2013.01); *H04N 2013/0081* (2013.01)

(58) Field of Classification Search
CPC .... G06T 7/521; G06V 10/107; G06V 10/143; G06V 10/147; G06V 10/751
See application file for complete search history.

(56) References Cited

U.S. PATENT DOCUMENTS

| | | | | |
|---|---|---|---|---|
| 2008/0285056 | A1* | 11/2008 | Blayvas | ................... G06T 7/521 356/603 |
| 2013/0278631 | A1* | 10/2013 | Border | ................... G06Q 30/02 345/633 |
| 2014/0132730 | A1* | 5/2014 | Blayvas | ................. G01B 11/25 348/46 |
| 2015/0192991 | A1* | 7/2015 | Dal Mutto | ........... G06F 3/0482 715/747 |
| 2015/0256813 | A1* | 9/2015 | Dal Mutto | ............... H04N 5/33 348/47 |
| 2016/0205311 | A1* | 7/2016 | Mandelli | ............. H04N 25/704 348/349 |
| 2020/0084387 | A1 | 3/2020 | Baldwin et al. | |
| 2020/0104034 | A1* | 4/2020 | Lee | ........................ H04N 23/67 |
| 2020/0242788 | A1* | 7/2020 | Jacobs | .................... G06T 7/593 |
| 2021/0042950 | A1* | 2/2021 | Wantland | ............. G06T 19/006 |
| 2021/0176385 | A1* | 6/2021 | Lee | ........................ H04N 23/45 |
| 2022/0021832 | A1* | 1/2022 | Geva | ................... H04N 25/705 |

* cited by examiner

Time of Flight
Laser
Source Camera

Infrared
Light
(Laser)

Object

Structured Light

Camera

Projector

Image

Object 1

Active Stereo

Passive Stereo

RGB-Ir Format

RGB-Ir Format

700

710 — Project randomized point pattern onto image of scene

720 — Capture images of scene using dual pixel sensor

730 — Generate disparity images from the captured images

740 — Determine depth of field from disparity images

750 — Use computed depth value to generate 3D image

800

ACTIVE DUAL PIXEL STEREO SYSTEM FOR DEPTH EXTRACTION

TECHNICAL FIELD

Examples set forth in the present disclosure relate to a system for extracting depth information from a scene. More particularly, but not by way of limitation, the present disclosure describes a miniaturized active dual pixel stereo system for close range depth extraction.

BACKGROUND

Depth sensing is central to many tasks including indoor mapping and architecture, autonomous vehicles, human body and face tracking, gesture detection, 3D image generation, and the like. Several types of depth sensors are known in the art.

For example, FIG. 1A illustrates a conventional structured light system including a light source (projector) 10 and a camera 20. The light source 10 projects a periodic pattern of light onto a scene, and the camera 20 captures an image of the scene including the projected pattern. A projector pixel of the projected pattern corresponding to an image pixel of the captured image is determined, and a disparity of each correspondence is determined. As used herein, disparity refers to the difference in image location of an object seen by respective cameras as a result of the horizontal separation of the respective cameras. Disparity in a camera can be found by using two two-dimensional images taken from different positions and correlating the images, provided the images have sufficient details and texture or non-uniformity. The calculated disparity is an amount that corresponding pixels are displaced between the projected pattern and the captured image. A three-dimensional model of the scene may be generated from the disparity. An augmented reality system using structured light is described, for example, in U.S. Pat. No. 10,909,373, assigned to Snap, Inc. of Santa Monica, CA. Such systems work well under good lighting conditions but are vulnerable to ambient illumination and multi-device interference.

FIG. 1B illustrates a conventional time-of-flight system that replaces the light source 10 with a laser source 30 that illuminates the image of the scene with infrared light and measures the flight time of light to measure distances to respective portions of the images in the scene. The distances are used to create a three-dimensional representation of the scene. However, time-of-flight systems are vulnerable to motion artifacts and multi-path interference.

FIG. 1C illustrates a conventional passive stereo system that includes a left camera 20 and a right camera 40 that detect the image of the scene to simulate human binocular vision and thus provide the ability to perceive depth using stereo disparity using triangulation. Passive stereo vision is suitable for applications with a large field of view and for outdoor usage but does not work particularly well in low light or for non-textured scenes.

FIG. 1D illustrates a conventional active stereo system that includes the left camera 20 and the right camera 40 as in the passive stereo system but adds a patterned infrared light source such as projector 50 that projects a pseudorandom pattern onto the image of the scene to provide texture to the scene. Such an approach is particularly useful for images including texture-less surfaces such as indoor dimly lit white walls. With a proper selection of wavelength sensing, the left camera 20 and right camera 40 capture a combination of active illumination and passive light, which improves upon the quality of the structured light to provide a solution that is robust for both indoor and outdoor scenarios. However, as such active stereo systems require two cameras and a projector, the miniaturization options are limited compared to two optical element systems.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawings. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawings are the following figures:

FIG. 2 illustrates a randomized point pattern sample that may be projected onto the image of the scene by a patterned infrared light source of an active stereo system in a sample configuration;

DETAILED DESCRIPTION

Figure 1B:
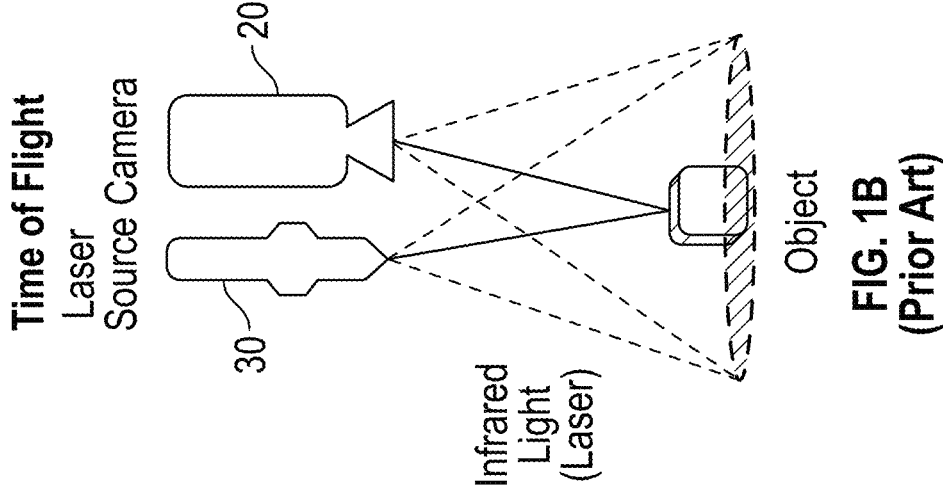
FIG. 1B illustrates a conventional time-of-flight system for extracting depth information.
Figure 1A:
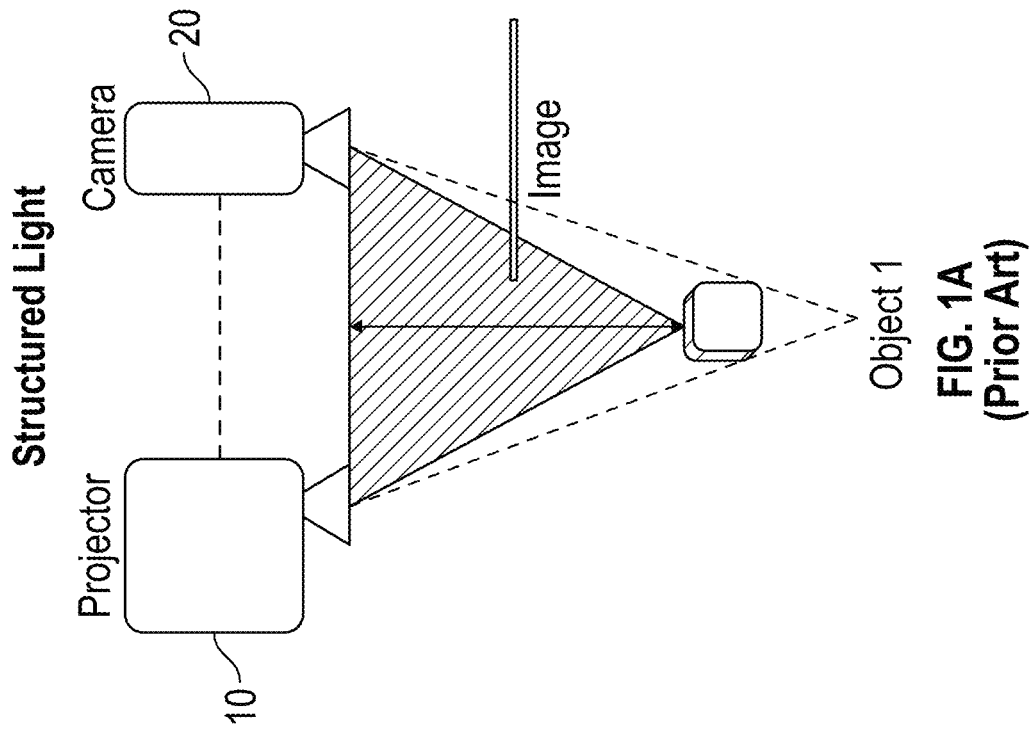
FIG. 1A illustrates a conventional structured light system for extracting depth information.
Figures 1C, 1D:
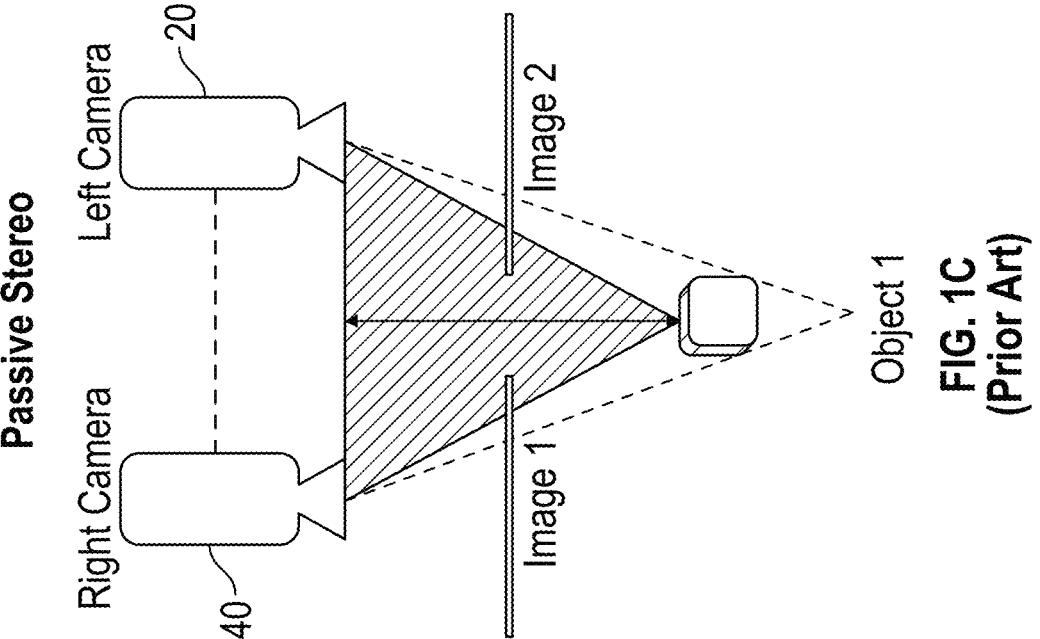
FIG. 1C illustrates a conventional passive stereo system for extracting depth information.
FIG. 1D illustrates a conventional active stereo system that includes two cameras and a patterned infrared light source for extracting depth information.

The following description relates to an active stereo system that is miniaturized for close range depth capture such as used for hand tracking and gesture capture by, for example, electronic eyewear devices. Instead of using two cameras coupled with a pattern projector as in a conventional active stereo system, a single dual pixel sensor coupled with a pattern projector is used to produce left and right images from the same lens and sensor. The resulting system is thus smaller with better coverage of the projected pattern over the image of the scene and is more suitable for incorporation into devices such as electronic eyewear devices that have significant size and power constraints. The resulting active dual pixel stereo system also has the advantage of reducing calibration requirements compared to a structured light system as the active dual pixel stereo system only requires a single sensor and a single projector. Also, since only one sensor is used, the active dual pixel stereo system provides higher robustness to bending since the active stereo system does not need to rely on a specific pattern and there is no need to account for the distance between two sensors.

This disclosure is thus directed to a system, method, and computer-readable medium containing instructions for implementing a miniaturized active dual pixel stereo system and method for close range depth extraction. The active dual pixel stereo system includes a projector adapted to project a locally distinct projected pattern, such as a randomized point pattern, onto an image of a scene and a dual pixel sensor including a dual pixel sensor array that generates respective displaced images of the scene. A three-dimensional image is generated from the displaced images of the scene by projecting the locally distinct projected pattern onto the image of the scene, capturing the respective displaced images of the scene using the dual pixel sensor, generating disparity images from the respective displaced images of the scene, determining depth to each pixel of the disparity images, and generating the three-dimensional image from the determined depth to each pixel. A three-dimensional image of a user's hands generated by the active dual pixel stereo system may be processed by gesture recognition software to provide an input to an electronic eyewear device.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below. A sample active dual pixel stereo system and method will be described with respect to FIGS. 2-8.

Those skilled in the art will appreciate that the conventional depth from stereo methods generally rely on texture for matching common features to establish disparities. However, for regions without texture, such matching cannot be reliably performed. For close range depth, the problem is more severe as edges and textures are sparse. Active stereo systems solve the texture problem by using a pattern projector to artificially add a pattern, thus improving upon passive stereo systems due to the improved edge and texture detection. It is desired to use active stereo system methods whereby the active stereo data processing algorithms may be used with minimal or no change and without requiring additional calibration. However, since active stereo systems are relatively large and usually implemented using several dedicated sensors, it also is desirable to miniaturize such systems so that they may be readily incorporated into portable electronic devices such as electronic eyewear devices.

To address these and other objectives, the two cameras used in a conventional active stereo system are replaced by a single dual pixel sensor that is similarly paired with a pattern projector, thus creating a very small baseline active stereo system. The resulting system has a fixed focal length and enables short-range high fidelity depth. Also, the baseline distance between the sensor and the pattern projector may be minimized for optimal miniaturization.

In sample configurations, the dual pixel sensor is sensitive to the wavelength of the pattern projector. Dual pixel IR only or dual pixel RGB-IR sensors may be used. With RGB only, the projected light needs to be visible. For RGB-IR sensors, the focal distance of the lens can be optimized for the RGB pixels, while leaving the IR pixels slightly out of focus, which might benefit the dual pixel sensor. Also, the RGB-IR sensor may be used for other tasks as well as being used as a regular RGB capture sensor.

Figure 2:
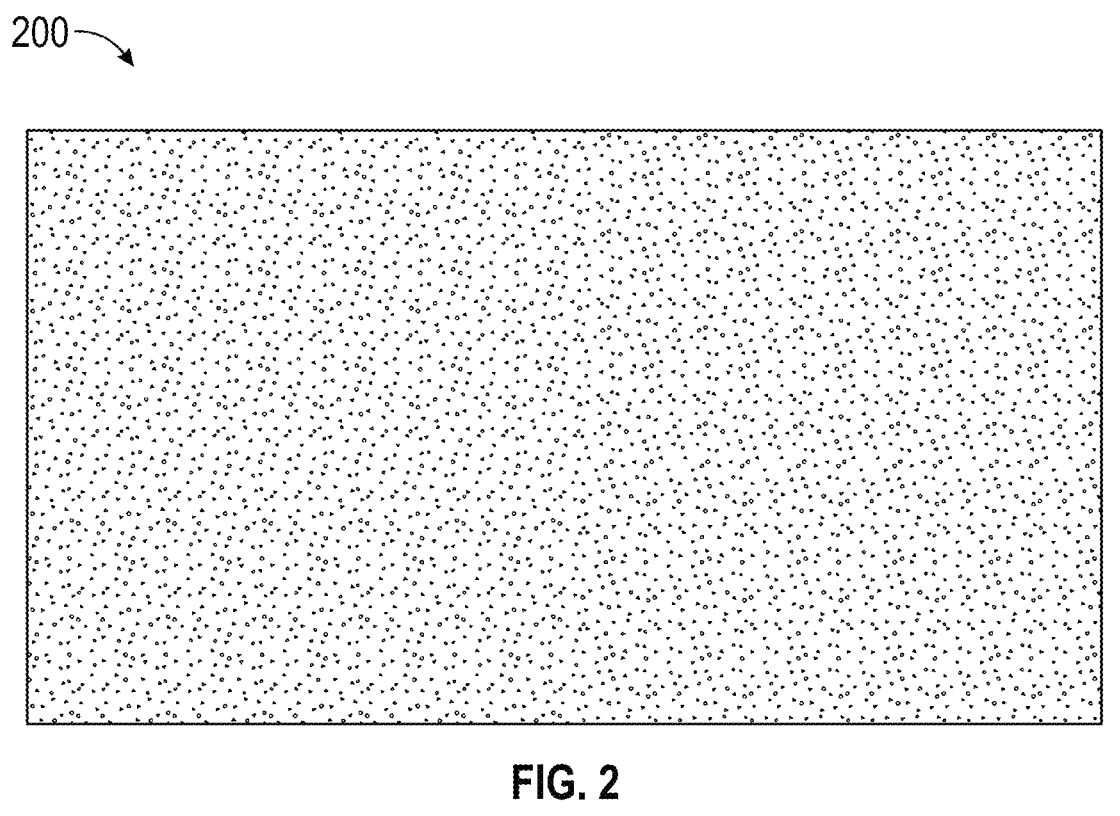
Figure 3:
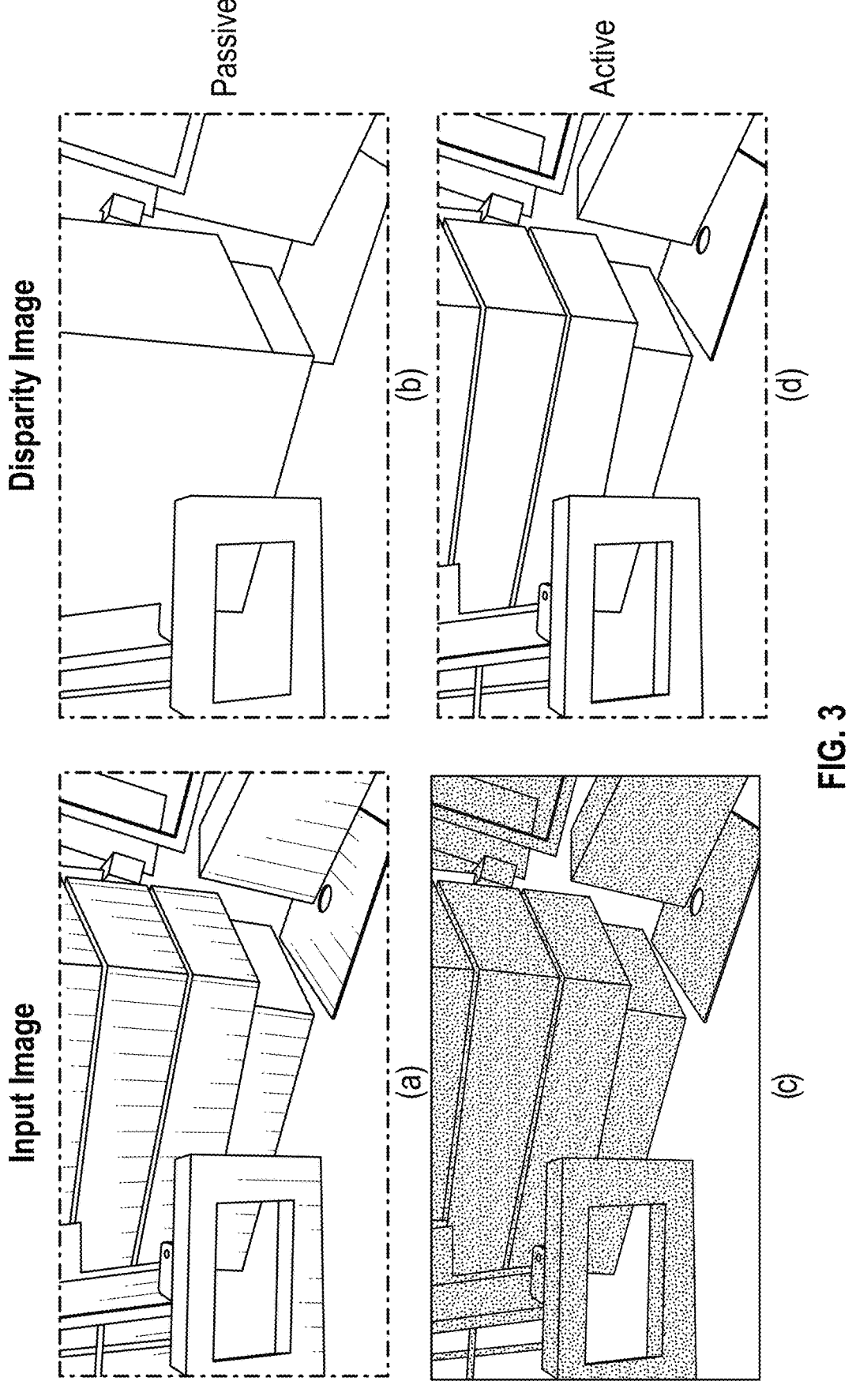
FIG. 3 illustrates input images without the point pattern projected onto the scene (at (a)) and projected onto the scene (at (c)) and the corresponding disparity images at (b) and (d) for passive stereo and active stereo, respectively.

FIG. 2 illustrates a sample locally distinct projected pattern in the form of a randomized point pattern sample 200 that may be projected onto the image of the scene by a patterned infrared light source of an active stereo system in a sample configuration. FIG. 3 illustrates input images without the point pattern 200 of FIG. 2 projected onto the scene (at (a)) and the corresponding disparity image at (b) and the input images with the point pattern 200 of FIG. 2 projected onto the scene (at (c)) and the corresponding disparity image at (d). Images (b) and (d) show pixel disparities computed on a local window and matched with a correlation-based cost. As illustrated, while in the passive case in (b) the disparity is valid only on the originally textured parts of the scene, in the active case at (d), texture exists almost everywhere, and the disparity may be computed more robustly.

Figure 4A:
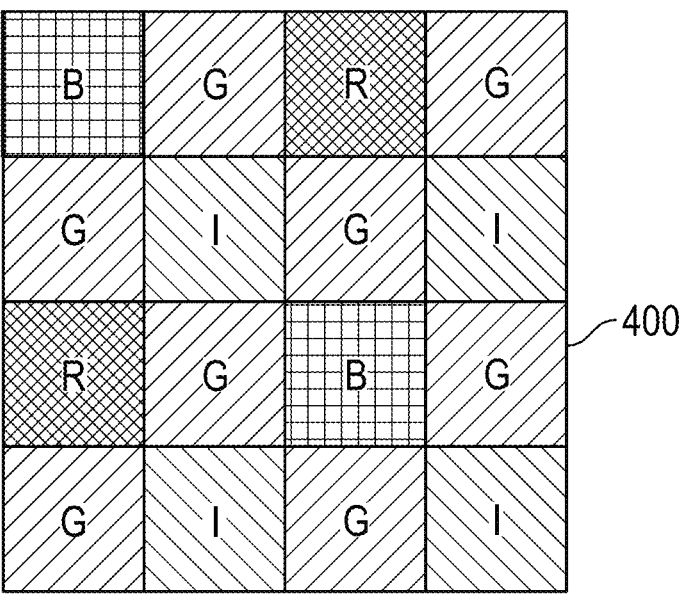
FIG. 4A illustrates an RGB-IR image sensor that enables infrared only light to be detected by converting several pixels of the sensor array to IR pixels that are sensitive only to infrared light.

Traditional CMOS image sensors employ a Bayer RGB format as a color filter array. The Bayer RGB format allows each pixel of the CMOS sensor to be excited by a specified wavelength of color and infrared light. On the other hand, RGB-IR format image sensors enable infrared only light to be passed to the IR pixels. In the RGB-IR format as illustrated in FIG. 4A, several pixels in the array 400 are converted to IR pixels that are sensitive only to infrared light. Cameras using the array of FIG. 4A enable the capture of both RGB and IR images in one device, making the camera usable for all lighting environments.

A camera using the array of FIG. 4A may extract RGB and IR information separately. The IR image is extracted by interpolating the sensor's RGB signal from pixels next to it. The RGB image is extracted using the following formulas:

$$R'=R-x^*IR$$

$$G'=G-x^*IR$$

$$B'=B-x^*IR$$

to obtain the R'G'B' image, where x* is a pre-calibrated IR removal coefficient.

Dual pixel sensors enable depth to be estimated from a single camera by leveraging the dual pixel auto-focus hardware that is common in modern camera sensors. Conventional monocular depth estimation techniques may be applied to the dual pixel data to create much smaller camera sensors that still provide high quality depth data. Dual pixel sensors, such as the IMX 663 available from Sony for RGB, work by splitting each pixel in half, such that the left half integrates light over the right half aperture and vice-versa. Since each half of a dual pixel integrates light over one half of the aperture, the two halves of a pixel together form a stereo pair in which nearby objects exhibit some horizontal disparity between the two views based on their distance from the sensor. This effect also interacts with the optical blur induced by the lens of the camera. Thus, when image content is far from the focal plane, the effects of optical blur are spread across the two views of each pixel. The sum of the two views accounts for all the light going through the aperture and is equal to the ordinary full-pixel image that would be captured by a non-dual-pixel sensor. As a result, the disparity between the two views in a dual-pixel image is proportional to what the defocus blur size would be in an equivalent full-pixel image. Dual pixel sensors are commonly used within cameras to aid in auto-focus by iteratively estimating disparity from the dual-pixels in a focus region and moving the lens until the disparity is zero to provide an image in which the focus region is in focus.

As described by Garg, et al. in "Learning Single Camera Depth Estimation Using Dual-Pixels," arXiv:1904.05822v3 [cs.CV], Aug. 14, 2019, dual pixel imagery may be thought of as a stereo pair with a tiny baseline that differs from stereo in several ways. The views are perfectly synchronized, both spatially and temporally, and have the same exposure and white balance. Also, the two views in the dual pixel images may have different point-spread functions that may encode additional depth information. However, depth from dual pixel data has both scale and offset ambiguities if the camera's focus distance is unknown. Garg, et al. address this ambiguity by providing a learning based approach for estimating depth from dual pixel cues that identifies a fundamental affine ambiguity regarding depth as it relates to dual pixel cues and providing a technique that allows neural networks to estimate depth from the dual pixel images despite the identified affine ambiguity.

Figure 4B:
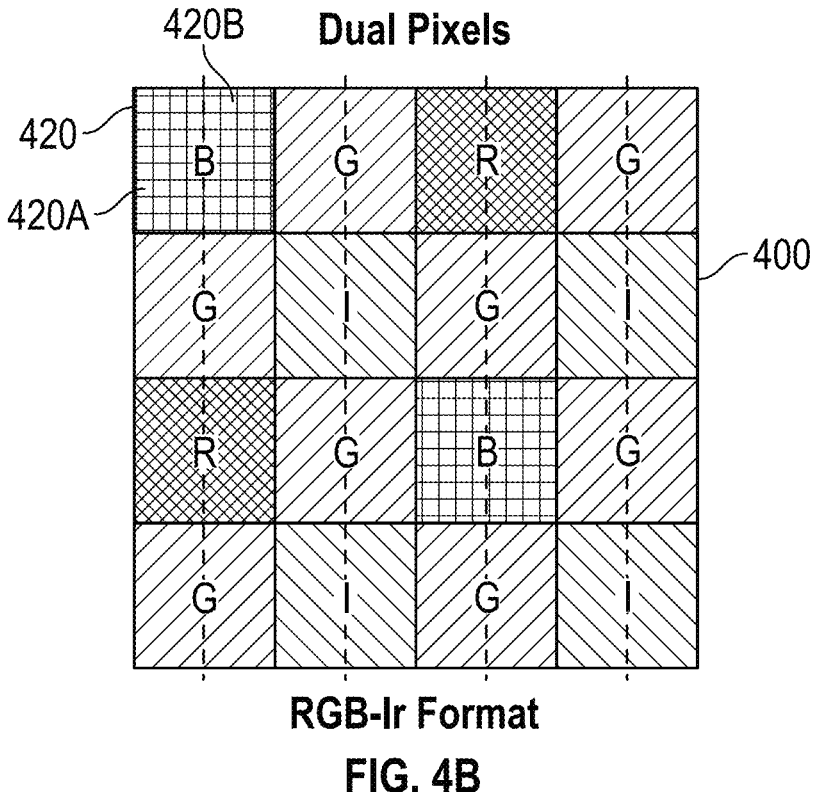
FIG. 4B illustrates a dual pixel RGB-IR image sensor of the type illustrated in FIG. 4A that has been adapted to use a dual pixel sensor technique that produces left and right images from the same lens and sensor in a sample configuration.

FIG. 4B illustrates a dual pixel RGB-IR image sensor that has been adapted to use a dual pixel sensor technique that produces left and right images from the same lens and sensor in a sample configuration. As illustrated, each pixel 420 of the RGB-IR array 410 is split into dual pixels 420A and 420B for processing by the camera. As noted above, a dual pixel image sensor splits each pixel in half such that the left half 420A integrates light over the right half aperture 420B and vice-versa. The two halves 420A and 420B of a pixel 420 together form a stereo pair in which nearby objects exhibit some horizontal disparity between the two views based on their distance from the sensor.

Figure 5:
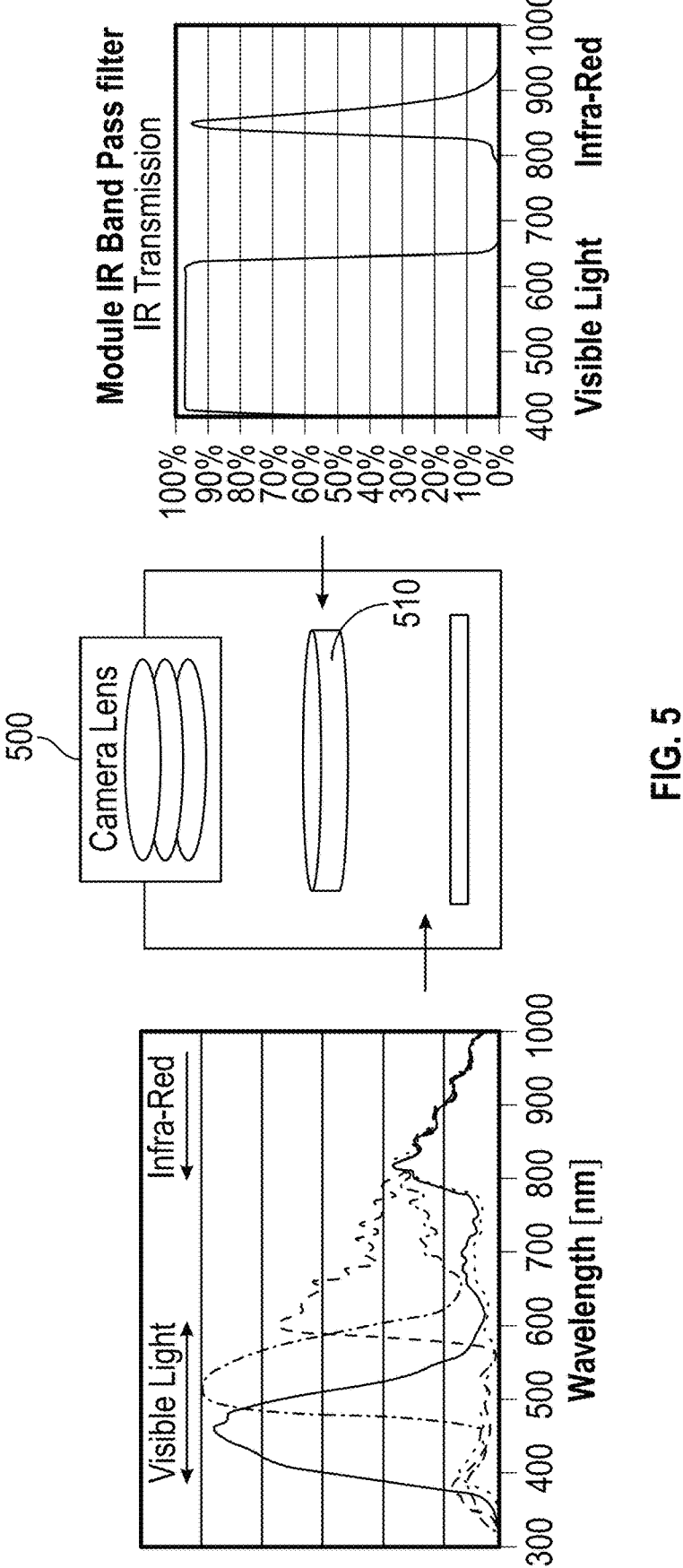
FIG. 5 illustrates a dual focal lens and dual band-pass filter used to pass both visible images and IR images to the dual pixel sensor in a sample configuration.

To obtain both visible and IR images with the RGB-IR dual pixel sensor array of FIG. 4B, a dual bandpass filter may be provided. FIG. 5 illustrates a sample dual focal lens 500 and dual band-pass filter 510 that may be used with the RGB-IR dual pixel sensor array 410 of FIG. 4B to selectively pass both visible images and IR images to the dual pixel sensor in a sample configuration.

Figure 6:
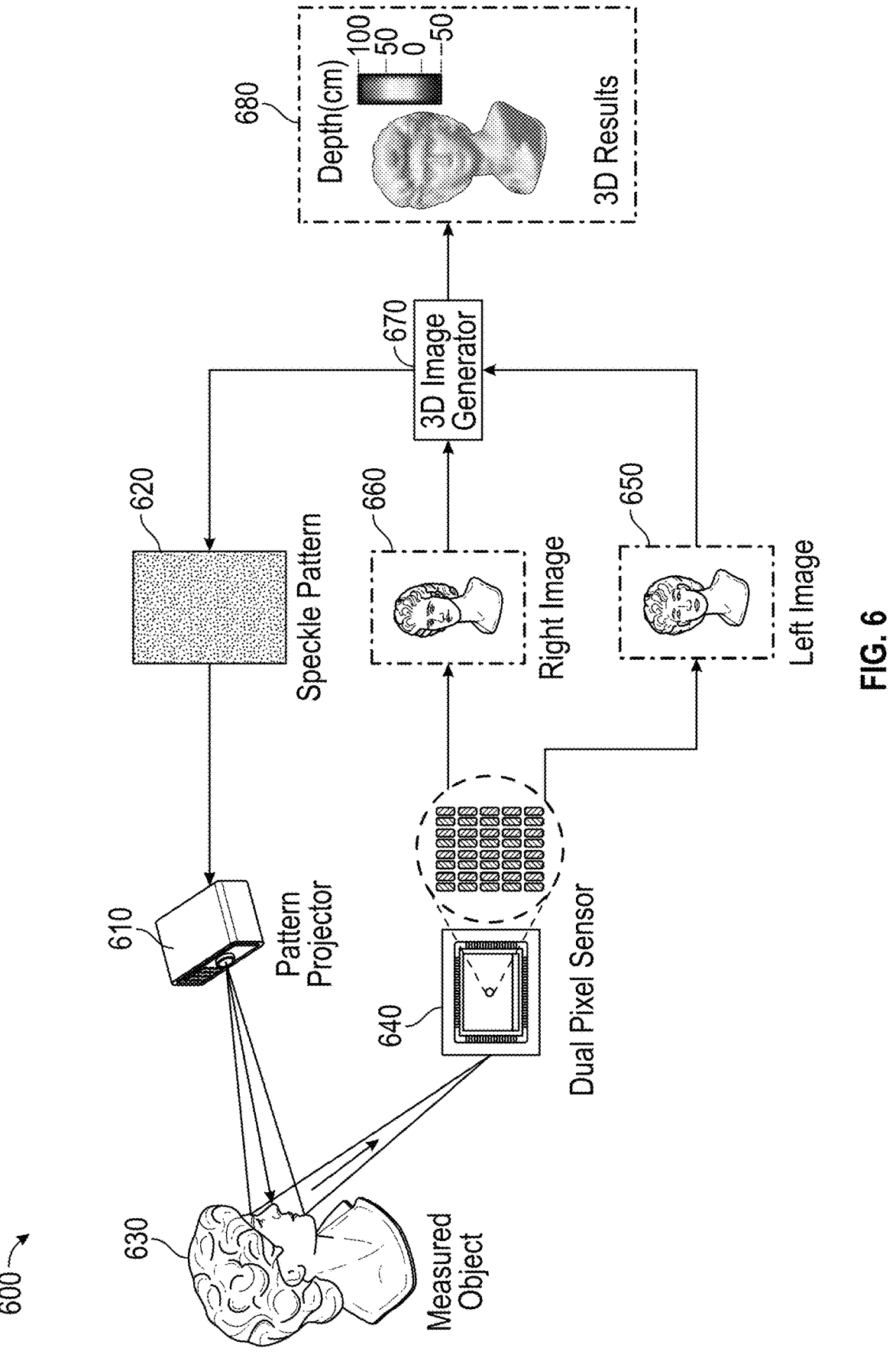
FIG. 6 illustrates an active stereo system adapted to use a dual pixel sensor with a pattern projector for close range depth extraction in a sample configuration.

FIG. 6 illustrates an active stereo system adapted to use a dual pixel sensor with a pattern projector for close range depth extraction in a sample configuration. The configuration 600 of FIG. 6 incorporates the pattern projector 610 from an active pixel sensor to project a randomized speckle pattern 620 such as the randomized point pattern sample 200 of FIG. 2 onto the measured object 630 under control of the 3D image generator 670. A dual pixel sensor 640 combining the dual pixel sensor array of FIG. 4B with the dual focal lens 500 and dual band-pass filter 510 of FIG. 5 is used to generate disparity images (left image 650 and right image 660) using, for example, a feature matching algorithm that measures displacement between feature points in the images. The disparity images are processed by the 3D image generator 670 to generate 3D images from the disparity images that encode the difference in horizontal coordinates of corresponding image points. The 3D image generator 670 may implement stereo extraction software to extract disparity and depth information from left and right images of a small baseline stereo pair. The values in the resulting disparity map are inversely proportional to the scene depth at the corresponding location. The disparity map values may be compared to calibrated values stored in a disparity map lookup table for extracting the depth information that corresponds to the measured values. For example, the calibrated values may be obtained by measuring disparity from a flat target at different distances and mapping the values back to distance and storing the values in the disparity map table for lookup. The disparity map table may be fixed, or a different table may be provided for each focus value. The computed depth value (z) is then used to generate a 3D image 680 that is presented to a display.

For example, if the pattern projector 610 and dual pixel sensor 640 are incorporated into an electronic eyewear device such as Spectacles™ available from Snap, Inc. of Santa Monica, CA, the generated 3D image 680 would be presented to the display of the electronic eyewear device. Also, the 3D image 680 could be processed by a gesture processor to provide close-range depth capture for hand tracking for identifying gestures for interfacing with the electronic eyewear device. The techniques described herein may also be adapted for use with other imaging systems that desire to implement robust depth sensing (e.g., robotic vision systems, etc.).

Figure 7:
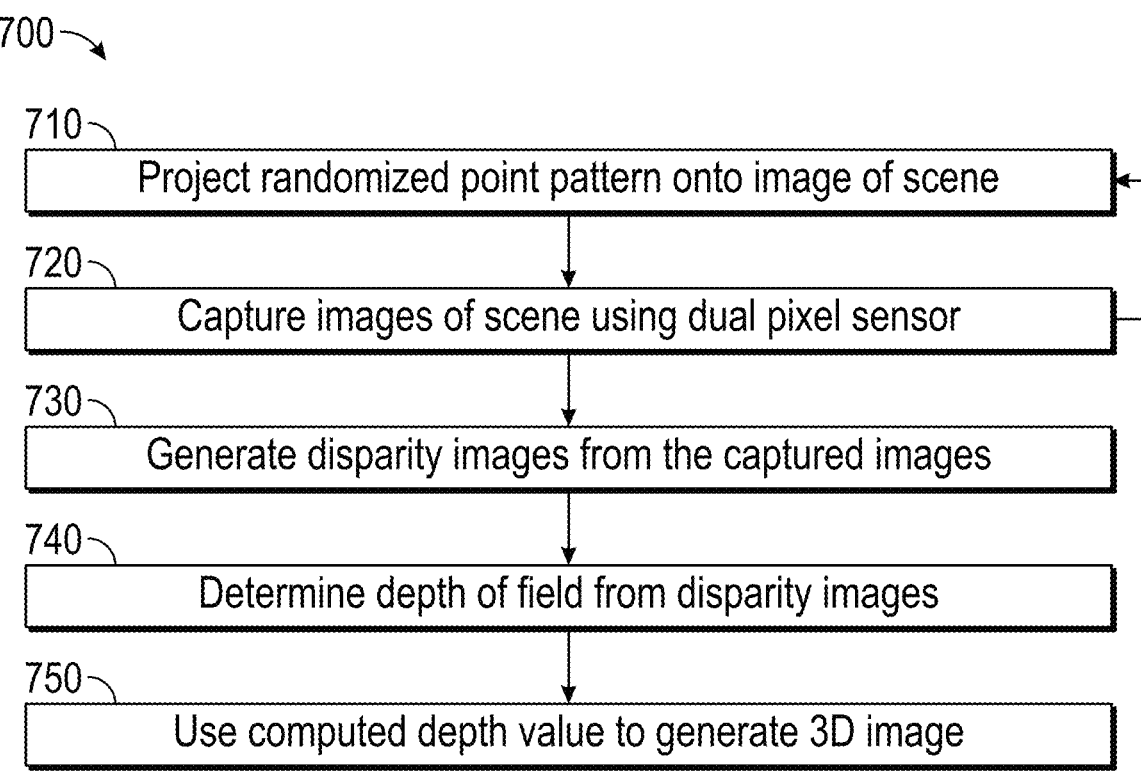
FIG. 7 illustrates a high-level functional block diagram of a method for creating a three-dimensional image from dual pixel sensor images in a sample configuration.

FIG. 7 illustrates a high-level functional block diagram of a method 700 for creating a three-dimensional image from dual pixel sensor images in a sample configuration.

The method 700 starts at 710 to initiate the active pixel stereo process by projecting a locally distinct projected pattern (e.g., FIG. 2) onto an image of a scene.

A dual pixel sensor of the type described with respect to FIG. 6 is used to capture images of the scene at 720.

A processing device of the camera (e.g., 3D image generator 670 in FIG. 6) then generates disparity images from the captured images of the scene at 730.

The depth to each pixel of the disparity images (depth of field) is determined from the disparity images at 740 by comparing values at each feature pixel in respective images to compute a value that is converted by the disparity map table into a depth value (z).

The computed depth value at each pixel is used to generate the three-dimensional (3D) image at 750.

The resulting active dual pixel stereo system also has the advantage of reducing calibration requirements as the active dual pixel stereo system only requires a single sensor and a single projector. Also, since only one sensor is used, the active dual pixel stereo system provides higher robustness to bending since the active stereo system does not need to rely on a specific pattern and there is no need to account for the distance between two sensors.

Also, the projected pattern may be optimized for a visible image or an IR image depending upon the lighting. The projected pattern may also be sparse enough not to blur values of pixels into one another. However, no special pattern is required. The pixels may or may not be adjusted into focus or the blur may be allowed to remain, as desired.

In addition, no special matching algorithm is required as the matching algorithms used with conventional stereoscopic processing systems may be used.

System Configuration

Techniques described herein may be used with one or more of the computer systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Figure 8:
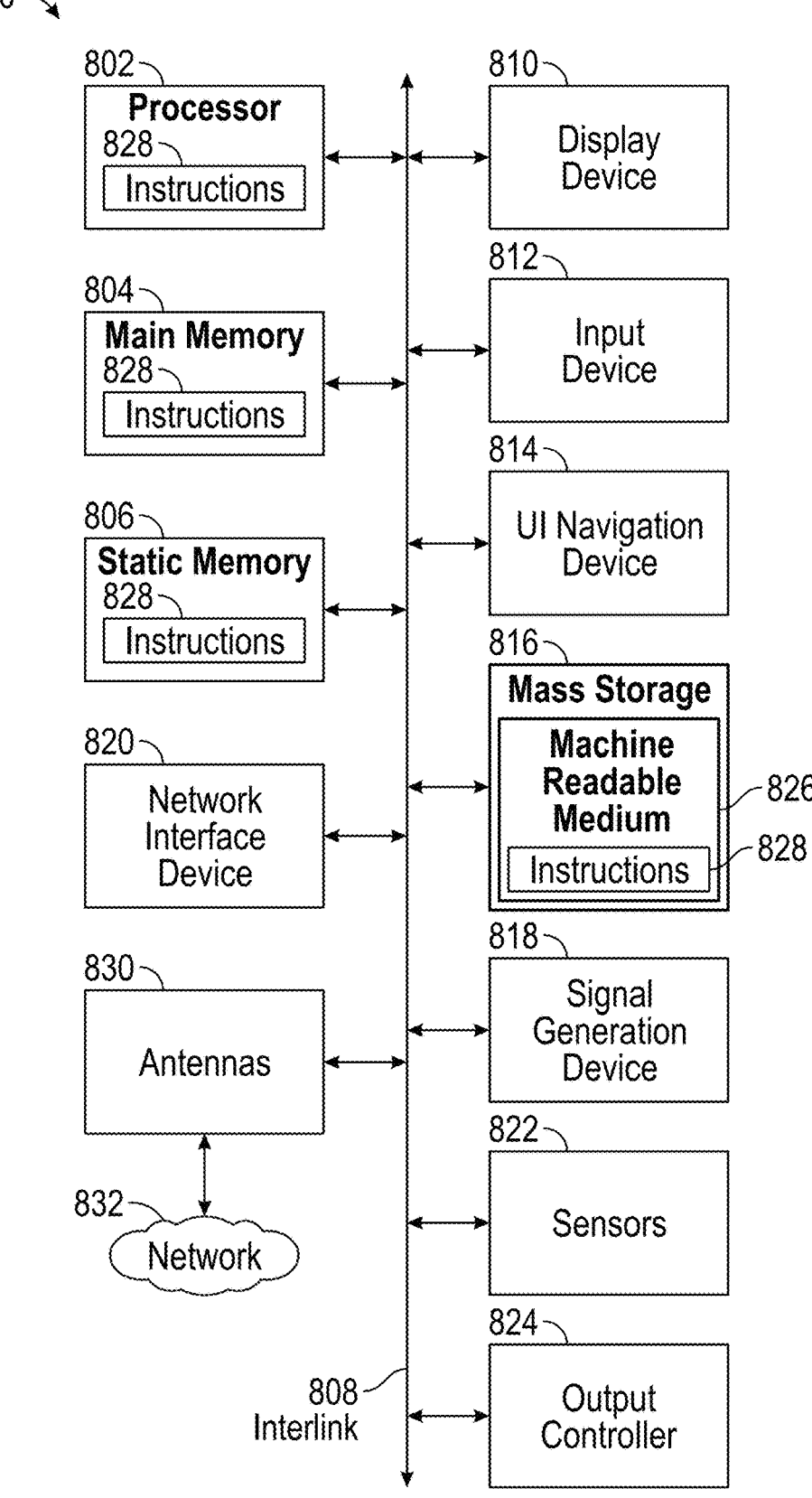
FIG. 8 illustrates a sample configuration of a computer system adapted to implement the method of creating three-dimensional images in accordance with the systems and methods described herein.

FIG. 8 illustrates a sample configuration of a computer system 800 adapted to manage the generation of 3D images using the active dual pixel stereo system described with respect to FIG. 6. For example, the computer system 800 may control the capture of images by the dual pixel sensor 640 as well as the generation of disparity images and 3D images by the image generator 670 as described herein.

In particular, FIG. 8 illustrates a block diagram of an example of a machine 800 upon which one or more configurations may be implemented. In alternative configurations, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. In sample configurations, the machine 800 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 800 may serve as a workstation, a front-end server, or a back-end server of a communication system. Machine 800 may implement the methods described herein by running the software used to implement the features described herein. Further, while only a single machine 800 is illustrated, the term "machine" shall also be taken to include any collection of machines that individually or jointly execute a set (or multiple sets) of instructions to perform any one or more of the methodologies discussed herein.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810 (shown as a video display), an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a mass storage device (e.g., drive unit) 816, a signal generation device 818 (e.g., a speaker), a network interface device 820, and one or more sensors 822. Example sensors 822 include one or more of a global positioning system (GPS) sensor, compass, accelerometer, temperature, light, camera, video camera, sensors of physical states or positions, pressure sensors, fingerprint sensors, retina scanners, or other sensors. The machine 800 may include an output controller 824, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 816 may include a machine readable medium 826 on which is stored one or more sets of data structures or instructions 828 (e.g., software) embodying or utilized by any one or more of the techniques or functions described herein. The instructions 828 may also reside, completely or at least partially, within the main memory 804, within static memory 806, or within the hardware processor 802 during execution thereof by the machine 800. In an example, one or any combination of the hardware processor 802, the main memory 804, the static memory 806, or the mass storage device 816 may constitute machine readable media.

While the machine readable medium 826 is illustrated as a single medium, the term "machine readable medium" may include a single medium or multiple media (e.g., at least one of a centralized or distributed database, or associated caches and servers) configured to store the one or more instructions 828. The term "machine readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine readable medium examples may include solid-state memories, and optical and magnetic media. Specific examples of machine readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 828 may further be transmitted or received over communications network 832 using a transmission medium via the network interface device 820. The machine 800 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WI-FI®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas 830 to connect to the communications network 832. In an example, the network interface device 820 may include a plurality of antennas 830 to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

The features and flow charts described herein can be embodied in one or more methods as method steps or in one or more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate the functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system or host computer of a service provider into the computer platforms of the smartwatch or other portable electronic devices. Thus, another type of media that may bear the programming, media content or metadata files includes optical, electrical, and electromagnetic waves, such as used across physical interfaces between local devices,

| through wired and optical landline networks and over various air-links. The physical elements that carry such waves, such as wired or wireless links, optical links, or the like, also may be considered as media bearing the software. As used herein, unless restricted to "non-transitory," "tangible," or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An active dual pixel stereo system for depth extraction, comprising:
    a projector adapted to project a locally distinct projected pattern onto an image of a scene, wherein the projected pattern comprises at least one of a visible light pattern or an infrared light pattern;
    a dual pixel sensor comprising a dual pixel RGB-infrared sensor array that generates respective infrared and RGB displaced images of the scene by splitting each pixel such that a first aperture of each pixel integrates light over a second aperture of each pixel and the second aperture of each pixel integrates light over the first aperture of each pixel whereby the first and second apertures of each pixel together form a stereo pair exhibiting disparity between two views of each pixel based on a distance from the dual pixel sensor;
    a dual focal lens and a dual band-pass filter that selectively pass infrared and visible images to the dual pixel sensor to generate the respective infrared and RGB displaced images of the scene;
    a memory that stores instructions; and
    at least one processor that executes the instructions to create a three-dimensional image from the infrared and RGB displaced images of the scene by performing operations including:
    projecting the locally distinct projected pattern onto the image of the scene;
    capturing the respective infrared and RGB displaced images of the scene using the dual pixel sensor;
    measuring displacements, using a feature matching algorithm, between respective feature points in the respective infrared and RGB displaced images to generate disparity images from the respective infrared and RGB displaced images of the scene;
    determining a depth to each pixel of the disparity images by comparing values at each feature pixel in the disparity images to compute a horizontal distance value and converting the horizontal distance value into a depth value using a disparity map table; and
    generating the three-dimensional image from the depth values to each pixel.

2. An active dual pixel stereo system as in claim 1, wherein the three-dimensional image comprises an image of a user's hands, further comprising gesture recognition software that is executed by the at least one processor to process the three-dimensional image of the user's hands to generate an input to an electronic eyewear device.

3. An active dual pixel stereo system as in claim 1, wherein the dual pixel sensor is sensitive to a wavelength of the projector.

4. A method of generating three-dimensional images of a scene, comprising:

projecting a locally distinct projected pattern onto an image of the scene, wherein the projected pattern comprises at least one of a visible light pattern or an infrared light pattern;

capturing respective infrared and RGB displaced images of the scene through a dual focal lens and a dual band-pass filter that selectively pass infrared and visible images to a dual pixel sensor comprising a dual pixel RGB-infrared sensor array that generates respective infrared and RGB displaced images of the scene by splitting each pixel such that a first aperture of each pixel integrates light over a second aperture of each pixel and the second aperture of each pixel integrates light over the first aperture of each pixel whereby the first and second apertures of each pixel together form a stereo pair exhibiting disparity between two views of each pixel based on a distance from the dual pixel sensor;

measuring displacements, using a feature matching algorithm, between respective feature points in the respective infrared and RGB displaced images to generate disparity images from the respective infrared and RGB displaced images of the scene;

determining a depth to each pixel of the disparity images by comparing values at each feature pixel in the disparity images to compute a horizontal distance value and converting the horizontal distance value into a depth value using a disparity map table; and generating the three-dimensional image from the depth values to each pixel.

5. The method of claim 4, wherein the three-dimensional image comprises an image of a user's hands, further comprising processing the three-dimensional image of the user's hands to generate an input to an electronic eyewear device.

6. A non-transitory computer-readable storage medium that stores instructions that when executed by at least one processor cause the at least one processor to generate three-dimensional images of a scene by performing operations comprising:

projecting a locally distinct projected pattern onto an image of the scene, wherein the projected pattern comprises at least one of a visible light pattern or an infrared light pattern;

capturing respective infrared and RGB displaced images of the scene through a dual focal lens and a dual band-pass filter that selectively pass infrared and visible images to a dual pixel sensor comprising a dual pixel RGB-infrared sensor array that generates respective infrared and RGB displaced images of the scene by splitting each pixel such that a first aperture of each pixel integrates light over a second aperture of each pixel and the second aperture of each pixel integrates light over the first aperture of each pixel whereby the first and second apertures of each pixel together form a stereo pair exhibiting disparity between two views of each pixel based on a distance from the dual pixel sensor;

measuring displacements, using a feature matching algorithm, between respective feature points in the respective infrared and RGB displaced images to generate disparity images from the respective infrared and RGB displaced images of the scene;

determining a depth to each pixel of the disparity images by comparing values at each feature pixel in the disparity images to compute a horizontal distance value and converting the horizontal distance value into a depth value using a disparity map table; and generating the three-dimensional image from the depth values to each pixel.

7. The computer-readable storage medium of claim 6, wherein the three-dimensional image comprises an image of a user's hands, further comprising instructions that when executed by the at least one processor further cause the at least one processor to process the three-dimensional image of the user's hands to generate an input to an electronic eyewear device.

\*   \*   \*   \*   \*